(12) United States Patent
Zuo et al.

(10) Patent No.: US 12,519,509 B2
(45) Date of Patent: Jan. 6, 2026

(54) COMMUNICATION AND RADAR TARGET DETECTION METHOD BASED ON INTELLIGENT OMNI-SURFACE

(71) Applicant: CHINA INFORMATION CONSULTING & DESIGNING INSTITUTE CO., LTD, Nanjing (CN)

(72) Inventors: Jiakuo Zuo, Nanjing (CN); Chenming Zhu, Nanjing (CN); Qiang Wang, Nanjing (CN); Fengqiang Peng, Nanjing (CN)

(73) Assignee: CHINA INFORMATION CONSULTING & DESIGNING INSTITUTE CO., LTD, Nanjing (CN)

( * ) Notice: Subject to any disclaimer, the term of this patent is extended or adjusted under 35 U.S.C. 154(b) by 259 days.

(21) Appl. No.: 18/578,071

(22) PCT Filed: Jul. 28, 2022

(86) PCT No.: PCT/CN2022/108545
§ 371 (c)(1),
(2) Date: Jan. 10, 2024

(87) PCT Pub. No.: WO2024/000718
PCT Pub. Date: Jan. 4, 2024

(65) Prior Publication Data
US 2024/0333340 A1    Oct. 3, 2024

(30) Foreign Application Priority Data
Jun. 30, 2022    (CN) .......................... 202210767251.7

(51) Int. Cl.
*H04B 7/04*    (2017.01)
*G01S 7/00*    (2006.01)

(52) U.S. Cl.
CPC .......... *H04B 7/04013* (2023.05); *G01S 7/003* (2013.01)

(58) Field of Classification Search
None
See application file for complete search history.

(56) References Cited

U.S. PATENT DOCUMENTS

2021/0012635 A1    1/2021    Hill et al.

FOREIGN PATENT DOCUMENTS

| CN | 105789877 A | 7/2016 |
|----|-------------|--------|
| CN | 106099384 A | 11/2016 |

(Continued)

OTHER PUBLICATIONS

Song, Intelligent Omni-Directional Surface, Mar. 12, 0221 (Year: 2021).*

(Continued)

*Primary Examiner* — Gary Lafontant
(74) *Attorney, Agent, or Firm* — CBM PATENT CONSULTING, LLC (57) ABSTRACT

It discloses a communication and radar target detection method based on an intelligent omni-surface, comprising step 1: constructing an optimization problem by maximizing a minimum beampattern gain as an objective function, the communication system being an integrated sensing and communication system based on an intelligent omni-surface; step 2: setting a constraint condition for the optimization problem constructed in the step 1, the constraint condition comprising a minimum rate constraint of a user, a maximum transmit power constraint of a base station, and amplitude and phase shaft constraints of the intelligent omni-surface; and step 3: solving the optimization problem after setting with the constraint condition to obtain an optimization solution for maximizing the minimum beam- (Continued)

pattern gain. According to the method, a capability of detecting the radar target is further improved under the condition that a quality of service of a communication user is guaranteed.

6 Claims, 4 Drawing Sheets

(56) References Cited

FOREIGN PATENT DOCUMENTS

| | | | | |
|---|---|---|---|---|
| CN | 108649336 A | 10/2018 | | |
| CN | 109037956 A | 12/2018 | | |
| CN | 110248366 A | 9/2019 | | |
| CN | 111430936 A | 7/2020 | | |
| CN | 112490679 A | * 3/2021 | ........... | H01Q 15/002 |
| CN | 112929068 A | 6/2021 | | |
| CN | 113660017 A | 11/2021 | | |
| CN | 114666815 A | 6/2022 | | |

OTHER PUBLICATIONS

Jiang Zhihao, Li Yuan; Metasurface Multibeam Antenna Technology and Its Application in Microwave Wireless Power Transfer Space Electronic Technology 2: 80-91 Pubication date: Apr. 25, 2020.

* cited by examiner

COMMUNICATION AND RADAR TARGET DETECTION METHOD BASED ON INTELLIGENT OMNI-SURFACE

TECHNICAL FIELD

The present invention relates to a communication system design method, and particularly, to a communication and radar target detection method based on an intelligent omni-surface.

BACKGROUND

With the rapid development of information technology, the deep integration of technologies such as mobile communication, Internet of Things, artificial intelligence and big data has spawned a series of new services such as immersive services, AI services and digital twin. These emerging services put forward higher requirements for 6G networks, making integrated sensing and communication become one of the leading trends of 6G technologies and services. IMT 2030(6G) Promotion Group has regarded a integrated sensing and communication technology as one of the potential technologies in the future 6G. The integrated sensing and communication technology will give the 6G network an ability to perceive a physical world all the time and everywhere, and open up an application space beyond the connection of traditional mobile communication networks.

At the same time, intelligent omni-surface, as a new intelligent reflecting surface technology, is considered as one of the most promising technologies to solve the difficulties faced by future wireless communication networks. The intelligent omni-surface is composed of a large number of passive elements, and each element can independently divide an incident signal into two parts, namely, a reflected signal and a transmitted signal. Therefore, the intelligent omni-surface can achieve 360° omnidirectional coverage of a communication area. In addition, by reasonably adjusting reflection and transmission coefficients of the intelligent omni-surface, a direct path signal, and reflection and transmission path signals in the communication system can be superimposed at a receiving end, thereby increasing a receiving signal power of a user end. At present, the research of the communication system based on the intelligent omni-surface has received heated discussion in the research community Based on this, the present invention proposes a communication and radar target detection method based on an intelligent omni-surface, and carries out system optimization with a goal of maximizing a minimum beampattern gain.

SUMMARY

Object of the present invention: the present invention provides a communication and radar target detection method based on an intelligent omni-surface by introducing an intelligent omni-surface into an integrated sensing and communication system.

To achieve the above object, the present invention discloses a communication and radar target detection method based on an intelligent omni-surface, which comprises a computer readable medium operable on a computer with memory for the communication and radar target detection method, and comprising program instructions for executing the following steps of:

step 1: constructing an optimization problem by maximizing a minimum beampattern gain as an objective function, the integrated sensing and communication system being an integrated sensing and communication system based on an intelligent omni-surface;

step 2: setting a constraint condition for the optimization problem constructed in the step 1, the constraint condition comprising a minimum rate constraint of a user, a maximum transmit power constraint of a base station, and amplitude and phase shaft constraints of the intelligent omni-surface;

step 3: solving the optimization problem after setting with the constraint condition to obtain a solution for maximizing the minimum beampattern gain; and step 4: controlling the base station, the intelligent omni-surface and the radar for improving accuracy and precision of the communication and radar target detection.

The integrated sensing and communication system based on the intelligent omni-surface in the step 1 is applied to a downlink communication, and a base station communicates with a user under the assistance of the intelligent omni-surface and completes radar target detection.

Each element of the intelligent omni-surface in the step 1 has a function of both reflected and transmitted signals. A signal reflected by the element is referred to as a reflected signal, and a signal passing through the element is referred to as a transmitted signal; and a communication area covered by the intelligent omni-surface is divided into two parts, which are a reflection area (an area covered by the reflected signal) and a transmission area (an area covered by the transmitted signal).

The optimization problem in the step 1 of the present invention is as follows:

$$\max_{w,R_0,v_r,v_t} \min_{q\in\{1,2,\ldots,Q\}} \mathcal{P}_{\theta_q}(w, R_0, v_t) \quad \text{(Formula 4.a)}$$

wherein, $w\in\mathbb{C}^{N\times 1}$ represents a transmitted beamforming vector, $R_0\in\mathbb{C}^{N\times N}$ is a covariance matrix of radar signals, $$v_r = \left[\sqrt{\lambda_1^r}\, e^{j\theta_1^r},\ \sqrt{\lambda_2^r}\, e^{j\theta_2^r},\ \ldots,\ \sqrt{\lambda_M^r}\, e^{j\theta_M^r}\right]^H$$

and $$v_t = \left[\sqrt{\lambda_1^t}\, e^{j\theta_1^t},\ \sqrt{\lambda_2^t}\, e^{j\theta_2^t},\ \ldots,\ \sqrt{\lambda_M^t}\, e^{j\theta_M^t}\right]^H$$

are reflected and transmitted beamforming vectors respectively, $\lambda_m^r$ and $\theta_m^r$ are a reflected amplitude and a reflected phase shift of an $m^{th}$ element of the intelligent omni-surface respectively, $\lambda_m^t$ and $\theta_m^t$ are a transmitted amplitude and a transmitted phase shift of the $m^{th}$ element of the intelligent omni-surface respectively, $\mathcal{P}_{\theta_q}(w, R_0, v_t)=\alpha^H(\theta_q)\Theta_t F(ww^H+R_0)F^H\Theta_t^H\alpha(\theta_q)$ is a beampattern gain, $\alpha(\theta_q)=[1, e^{j2\pi\Delta\sin\theta_q}, \ldots, e^{j2\pi(N-1)\Delta\sin\theta_q}]^T$ is a steering vector of a $q^{th}$ angle to be detected on the intelligent omni-surface, $\theta_q$ is the $q^{th}$ angle to be detected relative to the intelligent omni-surface, $\Theta_t=\text{diag}(v_t^H)$ is a transmitted beamforming diagnal matrix, $F\in\mathbb{C}^{M\times N}$ represents a channel between the intelligent omni-surface and the base station, M is a total number of elements of the intelligent omni-surface, N is a number of antennas equipped for the base station, Q is a total number of angles to be detected, $\Delta$ is a ratio of carrier wavelength to antenna spacing, $m\in\{1,2,\ldots,M\}$, $q\in\{1,2,\ldots,Q\}$, $\mathbb{C}^{N\times 1}$ represents a complex column vector of N dimension, and $\mathbb{C}^{M\times N}$ represents a complex number matrix of M×N dimension; diag {•} represents to converting the vector to a diagonal matrix, $(\bullet)^T$ and $(\bullet)^H$ respectively represent transposition and conjugate transposition of a vector, $e^{j\bullet}$ represents an exponential form of complex number, and sin(•) represents a sinusoidal function.

The constraint condition in the step 2 of the present invention comprises:

constraint condition 1: $R \geq R_{min}$ constraint condition 2: $\|w\|^2 + Tr(R_0) \leq P_{max}$ constraint condition 3: $\lambda_m^r + \lambda_m^t =$ $1, \lambda_m^r \in [0, 1], \lambda_m^t \in [0, 1], m \in \{1, 2, \ldots, M\}$ constraint condition 4: $\theta_m^r \in [0, 2\pi), \theta_m^t \in [0, 2\pi), m \in \{1, 2, \ldots, M\}$ constraint condition 5: $R_0 \geq 0$ wherein, $$R = \log_2\left(1 + \frac{|g^H \Theta_r F w|^2}{\sigma^2}\right)$$

is a an achievable data rate of the user, $g \in \mathbb{C}^{M \times 1}$ represents a channel between the user and the intelligent omni-surface, $\Theta_r = \text{diag}(v_r^H)$ is a reflected beamforming diagnal matrix, $R_{min}$ is a minimum rate of the user, $\sigma^2$ is a variance of an additive white Gaussian noise, $\pi$ is a ratio of circumference to diameter, $\|\bullet\|^2$ is a square of normal of a vector $l_2$, $Tr(\bullet)$ is a trace of matrix, $|\bullet|^2$ is a square of a complex modulus, $P_{max}$ represents a maximum transmission power of the base station, and $R_0 \geq 0$ represents that $R_0$ is a semi-positive definite matrix; and the constraint condition 1 is the minimum rate constraint of the user, the constraint condition 2 is the maximum transmit power constraint of the base station, the constraint condition 3 and the constraint condition 4 are amplitude and phase shaft constraints of the intelligent omni-surface respectively.

The method of solving the optimization problem after setting with the constraint condition in the step 3 of the present invention comprises:

step 3-1: initializing $V_r^{(0)}$ and $V_t^{(0)}$, and setting an iteration index $\tau_0=0$;

step 3-2: for given $V_r^{(\tau_0)}$ and $V_t^{(\tau_0)}$, updating $W^{(\tau_0+1)}$ and $R_0^{(\tau_0+1)}$ by using a closed-form solution of an active beamforming matrix and a covariance matrix;

step 3-3: for given $W^{(\tau_0+1)}$ and $R_0^{(\tau_0+1)}$, updating $V_r^{(\tau_0+1)}$, $V_t^{(\tau_0+1)}$ and $\chi^{(\tau_0+1)}$ by using a joint optimization algorithm of reflected and transmitted beamforming vectors;

step 3-4: setting $\tau_0=\tau_0+1$;

step 3-5: repeating the step 3-2 to the step 3-4 until $\chi^{(\tau_0)}$ is converged to obtain an optimal active beamforming matrix W, a radar covariance matrix $R_0$, a reflected beamforming matrix $V_r$ and a transmitted beamforming matrix $V_t$;

step 3-6: using Cholesky decomposition to recover and obtain an optimal active beamforming vector w, a reflected beamforming vector $v_r$ and a transmitted beamforming vector $v_t$ from the matrixes W, $V_r$ and $V_t$ respectively, which are $W=ww^H$, $V_r=v_r v_r^H$ and $V_t=v_t v_t^H$; and step 3-7: outputting the optimization solution for maximizing the minimum beampattern gain, which is, outputting an optimal transmitted beamforming vector w, a radar covariance matrix $R_0$, a reflected beamforming matrix $v_r$ and a transmitted beamforming matrix $v_t$;

wherein, $V_r \in \mathbb{C}^{M \times M}$ and $V_t \in \mathbb{C}^{M \times M}$ are a reflected beamforming matrix and a transmitted beamforming matrix respectively, $W \in \mathbb{C}^{N \times N}$ is an active beamforming matrix, and $\chi$ is an introduced variable, used for transforming the maximum-minimum optimization problem in the step 1 into the maximizing optimization problem; and $W^{(\tau_0)}$, $R_0^{(\tau_0)}$, $V_r^{(\tau_0)}$, $V_t^{(\tau_0)}$ and $\chi^{(\tau_0)}$ are values corresponding to W, $R_0$, $V_r$, $V_t$ and $\chi$ in the $\tau_0^{th}$ iteration.

The closed-form solution of the active beamforming matrix and the covariance matrix in the step 3-2 of the present invention is:

$$\begin{cases} \underline{W} = ww^H \\ \underline{R_0} = R_0 + \underline{W} - W \end{cases}$$

wherein, $w=(h^H \underline{W} h)^{-1/2} \underline{W} h$, and $h^H=g^H \Theta_r F$; and $\underline{W} \in \mathbb{C}^{N \times N}$ and $\underline{R_0} \in \mathbb{C}^{N \times N}$ are optimum solutions of a following convex optimization problem:

$$\max_{W, R_0, \chi > 0} \chi$$

constraint condition: $\mathcal{P}_{\theta_q}(W, R_0, v_t) \geq \chi$, $q \in \{1, 2, \ldots, Q\}$
constraint condition: $Tr(hh^H W) \geq \sigma^2(2^{R_{min}}-1)$
constraint condition: $Tr(W)+Tr(R_0) \leq P_{max}$
constraint condition: $R_0 \geq 0$, and $W \geq 0$ wherein, $\mathcal{P}_{\theta_q}(W, R_0, v_t)=\alpha^H(\theta_q)\Theta_t F(W+R_0)F^H \Theta_t^H \alpha(\theta_q)$, and $W \geq 0$ represents that W is a semi-positive definite matrix.

The joint optimization algorithm of the reflected and transmitted beamforming vectors in the step 3-3 comprises the specific steps as follows:

step 3-3-1: initializing $V_r^{(0)}$ and $V_t^{(0)}$ and a penalty coefficient $\eta$, wherein the penalty coefficient $\eta$ is used for punishing $\Psi(V_r, V_t) > 0$, and $\eta \gg 1$;

step 3-3-2: setting an iteration index $\tau_1=0$;

step 3-3-4: for given W and $R_0$, solving a joint optimization problem of the reflected and transmitted beamforming vectors, and updating $V_r^{(\tau_1+1)}$ and $V_t^{(\tau_1+1)}$;

step 3-3-5: setting $\tau_1=\tau_1+1$; and step 3-3-6: repeating the step 3-3-4 to the step 3-3-5 until $\Psi(V_r^{(\tau_1)}, V_t^{(\tau_1)})$ is converged;

wherein, $V_r^{(\tau_1)}$ and $V_t^{(\tau_1)}$ are values corresponding to $V_r$ and $V_t$ during the $\tau_1^{th}$ iteration respectively, $\Psi(V_r, V_t)=\|V_r\|_*-\|V_r\|_2+\|V_t\|_*-\|V_t\|_2$ is a penalty term, $\Psi(V_r^{(\tau_1)}, V_t^{(\tau_1)})=\|V_r^{(\tau_1)}\|_*-\|V_r^{(\tau_1)}\|_2+\|V_t^{(\tau_1)}\|_*-\|V_t^{(\tau_1)}\|_2$, $\|\bullet\|_*$ represents a kernel norm of a matrix, and $\|\bullet\|_2$ represents a spectral norm of the matrix.

The joint optimization problem of the reflected and transmitted beamforming vectors in the step 3-3-4 of the present invention is:

$$\min_{V_r, V_t, \chi > 0} \{-\chi + \eta \Psi(V_r, V_t)\}$$

constraint condition: $\mathcal{P}_{\theta_q}(W, R_0, V_t) \geq \chi$, $q \in \{1, 2, \ldots, Q\}$
constraint condition: $Tr(\Gamma V_r) \geq \sigma^2(2^{R_{min}}-1)$ constraint condition: $[V_r]_{m,m}+[V_t]_{m,m}=1$, $m\in\{1, 2, \ldots, M\}$ constraint condition: $V_r \geq 0$, and $V_t \geq 0$ wherein, $\mathcal{P}_{\theta_q}(W, R_0, V_t) = Tr(Y_q V_t)$, and $Y_q = \text{diag}(\alpha^H(\theta_q))F(W+R_0)F^H\text{diag}(\alpha(\theta_q))$; and $\Gamma = \text{diag}(g^H)FWF^H\text{diag}(g)$ $\Psi(V_r, V_t) = \|V_r\|_* - \nabla_r^{(\tau_1)} + \|V_t\|_* - \nabla_t^{(\tau_1)}$ is an approximate value of $\Psi(V_r, V_t)$, while $V_r \geq 0$ and $V_t \geq 0$ respectively represent that $V_r$ and $V_t$ are semi-positive definite matrixes; $\nabla_r^{(\tau_1)}$ and $\nabla_t^{(\tau_1)}$ are respectively first-order Taylor approximations of $\|V_r\|_2$ and $\|V_t\|_2$ during the $\tau_1^{th}$ iteration, which are defined as follows:

$$\overline{V}_r^{(\tau_1)} = \|V_r^{(\tau_1)}\|_2 + Tr\left[u_{max,r}^{(\tau_1)}(u_{max,r}^{(\tau_1)})^H(V_r - V_r^{(\tau_1)})\right]$$

$$\overline{V}_t^{(\tau_1)} = \|V_t^{(\tau_1)}\|_2 + Tr\left[u_{max,t}^{(\tau_1)}(u_{max,t}^{(\tau_1)})^H(V_t - V_t^{(\tau_1)})\right]$$

wherein, $u_{max,r}^{(\tau_1)}$ and $u_{max,t}^{(\tau_1)}$ are eigenvectors corresponding to maximum eigenvalues of $V_r^{(\tau_1)}$ and $V_t^{(\tau_1)}$ during the $\tau_1^{th}$ iteration respectively.

In the present invention, a radar target detection performance is improved by increasing a total number of elements M in the intelligent omni-surface.

Beneficial Effects

The present invention provides the 360° omnidirectional communication coverage by using the intelligent omni-surface, so that the base station can simultaneously realize the functions of communication and radar target detection under the assistance of the intelligent omni-surface. By jointly optimizing the transmitted beamforming vector, the covariance matrix of radar signals, and the reflected and transmitted beamforming vectors of the intelligent omni-surface at the base station end, an ability of the integrated sensing and communication system to detect radar targets is improved under the condition of ensuring a customer service quality.

BRIEF DESCRIPTION OF THE DRAWINGS

The advantages of the above and/or other aspects of the present invention will become more apparent by further explaining the present invention with reference to the following drawings and detailed description. The advantages of the above and/or other aspects of the present invention will become more apparent by further explaining the present invention with reference to the following drawings and detailed description.

DETAILED DESCRIPTION

The present invention is described below in details with reference to the accompanying drawings and the embodiments.

Figure 1:
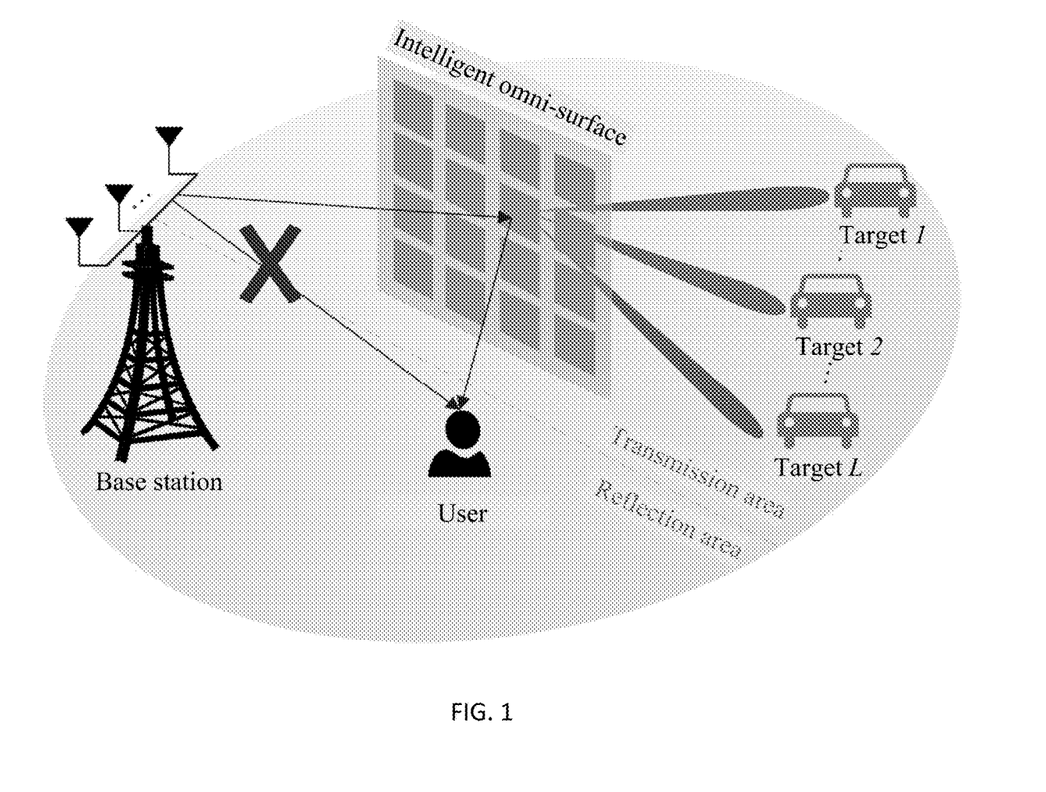
FIG. 1 is a schematic diagram of an application scenario of a communication and radar target detection method based on an intelligent omni-surface provided by the embodiments of the present invention.

The present invention provides a communication and radar target detection method based on an intelligent omni-surface applied to an integrated sensing and communication system based on an intelligent omni-surface. As shown in FIG. 1, the system comprises one base station, one intelligent omni-surface, one user and L (L≥1) radar targets. The user and the radar target are respectively located at two sides of the intelligent omni-surface. It is provided that the base station is equipped with N (N>1) antennas, the user is equipped with one antenna, and the intelligent omni-surface is composed of M (M>1) elements. Because of obstacles and other reasons, there is no direct link between the base station and the user, and the radar target is on a non-line-of-sight link of the base station. The base station performs downlink communication with the user under the assistance of the intelligent omni-surface, and completes a target detection function under the assistance of the intelligent omni-surface. Further, it is provided that the base station can accurately obtain all channel state information between the base station and the user, between the base station and the intelligent omni-surface, and between the user and the intelligent omni-surface, and an angle of the radar target relative to the intelligent omni-surface is known.

Each element of the intelligent omni-surface has a function of both reflected and transmitted signals. A signal reflected by the element is referred to as a reflected signal, and a signal passing through the element is referred to as a transmitted signal; and a communication area covered by the intelligent omni-surface is divided into two parts, which are a reflection area (an area covered by the reflected signal) and a transmission area (an area covered by the transmitted signal). As shown in FIG. 1, the user is distributed in the reflection area, and the radar target is distributed in the transmission area. Set $\lambda_m^r$ and $\lambda_m^t$ to respectively be a reflection amplitude and a transmission amplitude of an $m^{th}$ element of the intelligent omni-surface, and $\theta_m^r$ and $\theta_m^t$ be a reflection phase and a transmission phase of the $m^{th}$ element of the intelligent omni-surface respectively, wherein the amplitude and the phase meet the following constraints: $\lambda_m^r \in [0,1]$, $\lambda_m^r \in [0,1]$, $\theta_m^r \in [0, 2\pi)$, $\theta_m^r \in [0, 2\pi)$, and $\pi$ is a ratio of circumference to diameter. According to the law of conservation of energy, a sum of energy of the reflected signal and the transmitted signal is equal to an energy of an incident signal, so the reflection amplitude and the transmission amplitude should also meet the following constraint: $\lambda_m^r + \lambda_m^t = 1$ $\lambda_m^r + \lambda_m^t = 1$. Set $$v_r = \left[\sqrt{\lambda_1^r} e^{j\theta_1^r}, \sqrt{\lambda_2^r} e^{j\theta_2^r}, \ldots, \sqrt{\lambda_M^r} e^{j\theta_M^r}\right]^H$$

to represent a reflected beamforming vector, and $$v_t = \left[\sqrt{\lambda_1^t} e^{j\theta_1^t}, \sqrt{\lambda_2^t} e^{j\theta_2^t}, \ldots, \sqrt{\lambda_M^t} e^{j\theta_M^t}\right]^H$$

to represent a transmitted beamforming vector, wherein $[\cdot]^H$ represents a conjugate transposition of a vector, and $e^{j\cdot}$ represents an exponential form of complex number.

In order to realize the functions of communication and target detection at the same time, it is provided that the base station transmits a communication signal s and a radar signal $s_0 \in \mathbb{C}^{N \times 1}$ at the same time, wherein an average value of the radar signal $s_0$ is 0 and a covariance matrix is: $R_0 = \mathbb{E}(s_0 s_0^H) \in \mathbb{C}^{N \times N}$ wherein, $\mathbb{E}(\cdot)$ represents expectation, $\mathbb{C}^{N \times 1}$ represents a complex column vector of N dimension, and $\mathbb{C}^{N \times N}$ represents a complex number matrix of N×N dimension. It is further provided that the radar signal and the communication signal are independent of each other. Let w to represent a transmitted beamforming vector, then a transmitted signal at the base station end is: $x = ws + s_0$. A transmission power of the base station is $\mathbb{E}(\|ws + s_0\|^2) = \|w\|^2 + \text{Tr}(R_0)$, wherein $\|\cdot\|^2$ represents a square of normal of a vector $l_2$, and $\text{Tr}(\cdot)$ represents a trace of matrix. It is provided that a maximum transmission power of the base station is $P_{max}$, the following total transmit power constraints can be obtained: $\|w\|^2 + \text{Tr}(R_0) \le P_{max}$.

Set $F \in \mathbb{C}^{M \times N}$ to represent a channel between the intelligent omni-surface and the base station, and $g \in \mathbb{C}^{M \times 1}$ to represent a channel between the user and the intelligent omni-surface. A signal received by the user is:

$$y = g^H \Theta_r F w s + g^H \Theta_r F s_0 + z \quad \text{Formula (1)}$$

wherein, $\Theta_r = \text{diag}(v_r^H)$ is a reflected beamforming diagnal matrix, z is an additive white gaussian noise with an average value of 0, $\sigma^2$ is a variance, and $\text{diag}\{\cdot\}$ represents to converting the vector to a diagonal matrix.

Because the radar signal $s_0$ is predefined, it is known to the base station and the user. Therefore, it is provided that the user can cancel interference of the radar signal in the received signal. Then, a rate R of the user is:

$$R = \log_2\left(1 + \frac{|g^H \Theta_r F w|^2}{\sigma^2}\right) \quad \text{Formula (2)}$$

wherein, $|\cdot|^2$ represents a square of a complex modulus.

A radar target detection problem is discussed hereinafter. Because the radar target is in a non-line-of-sight area of the base station, a virtual line-of-sight link of the intelligent omni-surface is used for target detection. Set $\alpha(\theta) = [1, e^{j2\pi\Delta\sin\theta}, \ldots, e^{j2\pi(N-1)\Delta\sin\theta}]^T$ to be a steering vector of the intelligent omni-surface, wherein $\theta$ is an angle to be detected relative to the intelligent omni-surface, and $\Delta$ is a ratio of carrier wavelength to antenna spacing. Then, the beampattern gain is defined as:

$$\mathcal{P}_\theta(w, R_0, v_t) = \quad \text{Formula (3)}$$
$$\mathbb{E}\left(|\alpha^H(\theta)\Theta_t F(ws + s_0)|^2\right) = \alpha^H(\theta)\Theta_t F(ww^H + R_0) F^H \Theta_t^H \alpha(\theta)$$

wherein, $\Theta_t = \text{diag}(v_t^H)$ is a transmitted beamforming diagnal matrix, and $\sin(\cdot)$ represents a sinusoidal function.

It is provided there are Q (Q≥L) angles to be detected, and $\theta_q$ is a $q^{th}$ angle to be detected relative to the intelligent omni-surface. Considering the minimum rate constraint of the user, the amplitude and phase shaft constraints of the intelligent omni-surface and the total transmission power constraint, the optimization problem for maximizing the minimum beampattern gain is as follows:

$$\max_{w, R_0, v_r, v_t} \min_{q \in \{1, 2, \ldots, Q\}} \mathcal{P}_{\theta_q}(w, R_0, v_t) \quad \text{Formula (4.a)}$$

constraint condition: $R \ge R_{min}$ Formula (4.b)

constraint condition: $\|w\|^2 + \text{Tr}(R_0) \le P_{max}$ Formula (4.c)

constraint condition: $\lambda_m^r + \lambda_m^t = 1, \lambda_m^r \in [0, 1], \lambda_m^t \in [0, 1]$ Formula (4.d)

constraint condition: $\theta_m^r \in [0, 2\pi), \theta_m^t \in [0, 2\pi)$ Formula (4.e)

constraint condition: $R_0 \succeq 0$ Formula (4.f)

wherein, $R_{min}$ is a minimum rate of the user, $P_{max}$ is a maximum transmission power of the base station, $R_0 \succeq 0$ represents that $R_0$ is a semi-positive definite matrix, and $m \in \{1, 2, \ldots, M\}$. The constraint condition (4.b) is the minimum rate constraint of the user, the constraint condition (4.c) is the maximum transmit power constraint of the base station, the constraint conditions (4.d) and (4.e) are the amplitude and phase shaft constraints of the intelligent omni-surface respectively.

A variable $\chi > 0$ is introduced, used for transforming the maximum-minimum optimization problems (4) into the maximizing optimization problem. Then, the optimization problem (4) is equivalent to the following optimization problem:

$$\max_{w, R_0, v_r, v_t, \chi > 0} \chi \quad \text{Formula (5.a)}$$

constraint condition: $\mathcal{P}_{\theta_q}(w, R_0, v_t) \ge \chi, q \in \{1, 2, \ldots, Q\}$ Formula (5.b)

constraint condition: (4.b), (4.c), (4.d), (4.e) and (4.f) Formula (5.c)

According to an alternating optimization algorithm, a solution of the optimization problem (5) can be obtained by alternately solving the following two sub-optimization problems:

$$\max_{w, R_0, \chi > 0} \chi \quad \text{Formula (6.a)}$$

constraint condition: Formula (4.b), Formula (4.c), Formula (4.f), Formula (5.b) and Formula (6.b)

$$\max_{v_r, v_t, \chi > 0} \chi \quad \text{Formula (7.a)}$$

constraint condition: Formula (4.b), Formula (4.d), Formula (4.e), Formula (5.b) and Formula (7.b)

wherein, the sub-optimization problem (6) is a joint optimization problem of a transmitted beamforming vector and a radar covariance matrix, and the sub-optimization problem (7) is a joint optimization problem of reflected and transmitted beamforming vectors.

Algorithms for solving the sub-optimization problem (6) and the sub-optimization problem (7) are given below.

I. Solving the Sub-Optimization Problem (6)

Set $W = ww^H \in \mathbb{C}^{N \times N}$ to be a transmitted beamforming matrix and meet rank (W)=1, wherein rank $(\cdot)$ represents a matricial rank. The beampattern gain in the Formula (5.b) may be rewritten as: $\mathcal{P}_{\theta_q}(W, R_0, v_t) = \alpha^H(\theta_q)\Theta_t F(W+R_0) F^H \Theta_t^H \alpha(\theta_q)$. Solving the sub-optimization problem (6) may be equivalent to solving the following semi-positive definite optimization problem:

$$\max_{W, R_0, \chi > 0} \chi \quad \text{Formula (8.a)}$$

$$\text{constraint condition: } \mathcal{P}_{\theta_q}(W, R_0, v_t) \geq \chi, q \in \{1, 2, \ldots, Q\} \quad \text{Formula (8.b)}$$

$$\text{constraint condition: } Tr(hh^H W) \geq \sigma^2(2^{R_{min}} - 1) \quad \text{Formula (8.c)}$$

$$\text{constraint condition: } Tr(W) + Tr(R_0) \leq P_{max} \quad \text{Formula (8.d)}$$

$$\text{constraint condition: } R_0 \geq 0, W \geq 0 \quad \text{Formula (8.e)}$$

$$\text{constraint condition: } \text{rank}(W) = 1 \quad \text{Formula (8.f)}$$

wherein, $h^H = g^H \Theta_r F = v_r^H \text{diag}(g^H) F$, and $W \geq 0$ represents that W is a semi-positive definite matrix.

Because the constraint condition (8.f) is nonconvex, the optimization problem (8) is nonconvex. In order to solve this problem, the constraint condition (8.f) may be removed first, and then the following relaxed semi-positive definite optimization problem is obtained:

$$\max_{W, R_0, \chi > 0} \chi \quad \text{Formula (9.a)}$$

constraint condition: Formula (8.b), Formula (8.c), Formula (8.d), Formula (8.e), and Formula (9.b)

Obviously, the optimization problem (9) is a convex optimization problem. Set $\underline{W} \in \mathbb{C}^{N \times N}$ and $\underline{R_0} \in \mathbb{C}^{N \times N}$ are optimum solutions of the optimization problem (9), and the usual rank of $\underline{W}$ is not 1. Next, the optimal solution of the optimization problem (9) is used to construct an optimal solution of the optimization problem (8).

Theorem 1: set W and $R_0$ to be the optimal solution of the optimization problem (8), then the active beamforming matrix W and the covariance matrix $R_0$ can be obtained by the following closed-form solution:

$$\begin{cases} W = ww^H \\ R_0 = \underline{R_0} + \underline{W} - W \end{cases} \quad \text{Formula (10)}$$

wherein, $w = (h^H \underline{W} h)^{-1/2} \underline{W} h$.

Prove that: it can be obtained from Formula (10) that: $W + R_0 = \underline{W} + \underline{R_0}$, therefore, the following formula can be established:

$$\mathcal{P}_{\theta_q}(W, R_0, v_t) = \mathcal{P}_{\theta_q}(\underline{W}, \underline{R_0}, v_t) \quad \text{Formula (11)}$$

Formula (11) illustrates that W and $R_0$ meet the constraint condition (8.b). Moreover, W and $R_0$ also meet the constraint condition (8.d).

Further, it can be obtained according to Formula (10) that:

$$W = \frac{\underline{W} h h^H \underline{W}}{h^H \underline{W} h} = \frac{\underline{W} F^H \text{diag}(g) V_r \text{diag}(g^H) F \underline{W}}{Tr(\underline{W} F^H \text{diag}(g) V_r \text{diag}(g^H) F)}.$$

Substituting the formula into the constraint condition (8.c) can get:

$$Tr(hh^H \underline{W}) \geq \frac{1}{\sigma^2}(2^{R_{min}} - 1).$$

This illustrates that W and $R_0$ also meet the constraint condition (8.c).

For any column vector $a \in \mathbb{C}^{N \times 1}$, the following formula holds:

$$a^H(\underline{W} - W)a = a^H \underline{W} a - |a^H \underline{W} h|^2 \frac{1}{h^H \underline{W} h} \quad \text{Formula (12)}$$

According to Cauchy-Schwarz inequality, it is knowable that:

$(a^H \underline{W} a)(h^H \underline{W} h) \geq |a^H \underline{W} h|^2$. The following inequality can be obtained with reference to Formula (12): $a^H(\underline{W} - W) a \geq 0$, therefore, $\underline{W} - W \geq 0$. In addition, as $\underline{W} \geq 0$ and $\underline{R_0} \geq 0$, $R_0 \geq 0$. Furthermore, it is known that W and $R_0$ also meet the constraint condition (8.e).

To sum up, W and $R_0$ are the optimum solutions of the optimization problem (8).

II. Solving the Sub-Optimization Problem (7)

Set $V_t = v_t^H v_t \in \mathbb{C}^{M \times M}$ and $V_r = v_r^H v_r \in \mathbb{C}^{M \times M}$ to be a transmitted beamforming matrix and a reflected beamforming matrix respectively, and meet rank $(V_r) = 1$ and rank $(V_t) = 1$. Then, the beampattern gain in Formula (5.b) is re-written as:

$$\mathcal{P}_{\theta_q}(W, R_0, V_t) = Tr(\Upsilon_q V_t) \quad \text{Formula (13)}$$

wherein, $$\Upsilon_q = \text{diag}(\alpha^H(\theta_q)) F(W + R_0) F^H \text{diag}(\alpha(\theta_q)).$$

Solving the sub-optimization problem (7) may be equivalent to solving the following optimization problem:

$$\max_{V_r, V_t, \chi > 0} \chi \quad \text{Formula (14.a)}$$

$$\text{constraint condition: } \mathcal{P}_{\theta_q}(W, R_0, V_t) \geq \chi, q \in \{1, 2, \ldots, Q\} \quad \text{Formula (14.b)}$$

$$\text{constraint condition: } Tr(\Gamma V_r) \geq \sigma^2(2^{R_{min}} - 1) \quad \text{Formula (14.c)}$$

$$\text{constraint condition: } [V_r]_{m,m} + [V_t]_{m,m} = \quad \text{Formula (14.d)}$$

$$1, m \in \{1, 2, \ldots, M\}$$

$$\text{constraint condition: } V_r \geq 0, V_t \geq 0 \quad \text{Formula (14.e)}$$

$$\text{constraint condition: rank}(V_r) = 1, \text{rank}(V_t) = 1 \quad \text{Formula (14.f)}$$

wherein $\Gamma = \text{diag}(g^H) F W F^H \text{diag}(g)$, while $V_r \geq 0$ and $V_t \geq 0$ respectively represent that $V_r$ and $V_t$ are semi-positive definite matrixes.

Because the constraint condition (14.f) is nonconvex, the optimization problem (14) is a nonconvex optimization problem. In order to deal with a nonconvex rank 1 constraint problem, a penalty term may be introduced into an objective function. The penalty is defined as:

$$\Psi(V_r, V_t) = \|V_r\|_* - \|V_r\|_2 + \|V_t\|_* - \|V_t\|_2 \quad \text{Formula (15.f)}$$

wherein, $\|\cdot\|_*$ represents a kernel norm of a matrix, and $\|\cdot\|_2$ represents a spectral norm of the matrix.

Then, solving the optimization problem (14) is equivalent to solving the following optimization problem:

$$\min_{V_r, V_t, \chi > 0} \{-\chi + \eta \Psi(V_r, V_t)\} \quad \text{Formula (16.a)}$$

constraint condition: Formula (14.b), Formula (14.c), Formula (14.d), Formula (14.e) and Formula (16.b)

wherein, $\eta \gg 1$ is a penalty coefficient, used for punishing $\Psi(V_r, V_t) > 0$. Because a sum in the penalty term is nonconvex, the optimization problem (16) is still nonconvex, and first-order Taylor approximation may be used to solve this problem. During an $\tau_1^{th}$ iteration, the following substitution function is defined:

$$\overline{V}_r^{(\tau_1)} = \|V_r^{(\tau_1)}\|_2 + Tr\left[u_{max,r}^{(\tau_1)}(u_{max,r}^{(\tau_1)})^H(V_r - V_r^{(\tau_1)})\right] \quad \text{Formula (17)}$$

$$\overline{V}_t^{(\tau_1)} = \|V_t^{(\tau_1)}\|_2 + Tr\left[u_{max,t}^{(\tau_1)}(u_{max,t}^{(\tau_1)})^H(V_t - V_t^{(\tau_1)})\right] \quad \text{Formula (18)}$$

wherein, $V_r^{(\tau_1)}$ and $V_t^{(\tau_1)}$ respectively values of $V_r$ and $V_t$ during the $\tau_1^{th}$ iteration, $u_{max,r}^{(\tau_1)}$ and $u_{max,t}^{(\tau_1)}$ are respectively eigenvectors corresponding to maximum eigenvalues of $V_r^{(\tau_1)}$ and $V_r^{(\tau_1)}10\}$ during the $\tau_1^{th}$ iteration.

Then, during the $\tau_1^{th}$ iteration, the penalty term is approximated as:

$$\Psi(V_r, V_t) = \|V_r\|_* - \overline{V}_r^{(\tau_1)} + \|V_t\|_* - \overline{V}_t^{(\tau_1)} \quad \text{Formula (19)}$$

According to the above-mentioned analysis, solving the optimization problem (16) is transformed to iteratively solving the following convex optimization problem:

$$\min_{V_r, V_t, \mu \geq 0} \{-\chi + \eta \Psi(V_r, V_t)\} \quad \text{Formula (20a)}$$

constraint condition: Formula (14.b), Formula (14.c), Formula (14.d), Formula (14.e) and Formula (20.b)

In conclusion, the specific steps of the joint optimization algorithm of the reflected and transmitted beamforming vectors proposed by the present invention are as follows:

step 1: initializing $V_r^{(0)}$ and $V_t^{(0)}$, and setting a penalty coefficient as $\eta$;

step 2: setting a iteration index to be $\tau_1 = 0$;

step 3: for given W and $R_0$, solving an optimization problem (20) to update $V_r^{(\tau_1+1)}$ and $V_t^{(\tau_1+1)}$;

step 4: setting $\tau_1 = \tau_1 + 1$; and step 5: repeating the step 4 and the step 5 until $\Psi(V_r^{(\tau_1)}, V_t^{(\tau_1)})$ is converged.

III. Solving the Original Optimization Problem (4) by Using an Alternating Optimization Algorithm The solution of the original optimization problem (4) can be obtained by alternately solving the sub-optimization problem (7) and the sub-optimization problem (8). According to the above analysis, the specific steps of the alternating optimization algorithm for solving the original optimization problem (4) proposed by the present invention are as follows:

step 1: initializing $V_r^{(0)}$ and $V_t^{(0)}$, and setting an iteration index as $\tau_0 = 0$;

step 2: for given $V_r^{(\tau_0)}$ and $V_t^{(\tau_0)}$, using the closed-form solution Formula (10) to update $W^{(\tau_0+1)}$ and $R_0^{(\tau_0+1)}$;

step 3: for given $W^{(\tau_0+1)}$ and $R_0^{(\tau_0+1)}$, updating $V_r^{(\tau_0+1)}$, $V_t^{(\tau_0+1)}$ and $\chi^{(\tau_0+1)}$ by using a joint, optimization algorithm of reflected and transmitted beamforming vectors;

step 4: setting $\tau_0 = \tau_0 + 1$;

step 5: repeating the step 2 to the step 4 until $\chi^{(\tau_0)}$ is converged to obtain an optimal transmitted beamforming matrix W, a radar covariance matrix $R_0$, a reflected beamforming matrix $V_r$ and a transmitted beamforming matrix $V_t$;

step 6: using Cholesky decomposition to recover and obtain an optimal active beamforming vector w, a reflected beamforming vector $v_r$ and a transmitted beamforming vector $v_t$ from the matrixes W, $V_r$ and $V_t$ respectively, which are $W = ww^H$, $V_r = v_r v_r^H$ and $V_t = v_t v_t^H$; and step 7: outputting the optimization solution for maximizing the minimum beampattern gain, which is, outputting an optimal active beamforming vector w, a radar covariance matrix $R_0$, a reflected beamforming matrix $v_r$ and a transmitted beamforming matrix $v_t$.

Simulation Example

Figure 2:
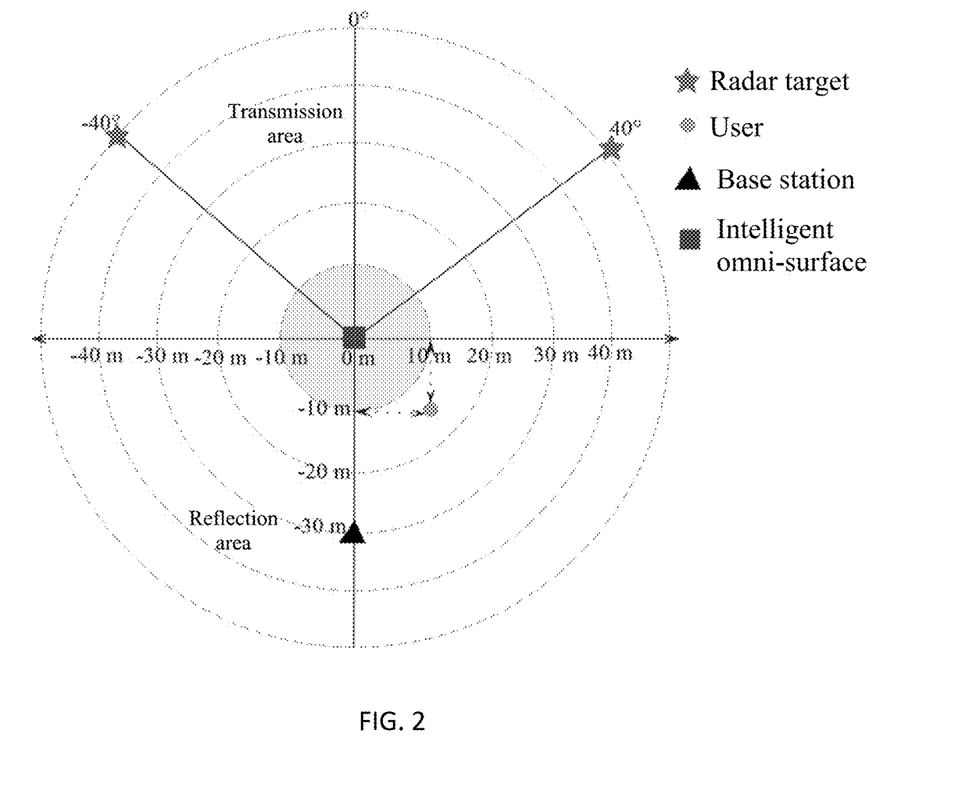
FIG. 2 is a simulation schematic diagram of a communication and radar target detection method based on an intelligent omni-surface provided by the embodiments of the present invention.

The present invention is simulated hereinafter and performances thereof are analyzed. Coordinate positions of a base station, an intelligent omni-surface, a user and a radar target are shown in FIG. 2, wherein a total number of radar targets L=2 and the angles are respectively: $\theta_1 = -40°$ and $\theta_2 = 40°$. Set $\Pi$ to represent a beam pattern width and as $\Gamma = 10°$. Then, scopes of angles to be detected of the two radar targets are respectively:

$$Q_1 = \left[\theta_1 - \frac{\Pi}{2}, \theta_1 + \frac{\Pi}{2}\right] \text{ and } Q_2 = \left[\theta_2 - \frac{\Pi}{2}, \theta_2 + \frac{\Pi}{2}\right].$$

Set $\overline{\mathcal{P}}_\theta$ to represent ideal beampattern gain, then $\overline{\mathcal{P}}_\theta$ may be defined as:

$$\overline{\mathcal{P}}_\theta = \begin{cases} 1, \theta \in Q_1 \text{ or } \theta \in Q_2 \\ 0, \text{ other} \end{cases}.$$

Further, the angle scope $[-90°, 90°]$ discreted is divided into 100 parts on average. A number Q of the angles to be detected is a total number of angles included after the discretizing of the scopes of the angles to be detected $\mathcal{Q}_1$ and $\mathcal{Q}_2$. Moreover, it is provided that a number of antennas of the base station N=10, a maximum transmit power of the base station $P_{max} = 30$ dBm, a minimum rate of the user $R_{min} = 0.5$ bits/s/Hz, and a noise power $\sigma^2 = -90$ dBm. The channels involved are modeled by Rice channel, and it is provided that a path loss exponent is 2.2 and a path loss at a reference distance of one meter is 30 dBm. Through this embodiment, the optimization problem after setting with the constraint condition is solved to obtain the solution for maximizing the minimum beampattern gain, and the active beamforming vector w, the radar covariance matrix $R_0$, the reflected beamforming vector $v_r$ and the transmitted beamforming vector $v_t$ are obtained. That is, when the active beamforming vector of the base station is w, the average value of the radar signal is 0, the radar covariance matrix is $R_0$, the reflected beamforming vector of the intelligent omni-surface is $v_r$, and the transmitted beamforming vector is $v_t$, the method provided by this embodiment can realize radar target detection on the premise of ensuring the communication Quality of Service (QoS) between the base station and the user.

Figure 3:
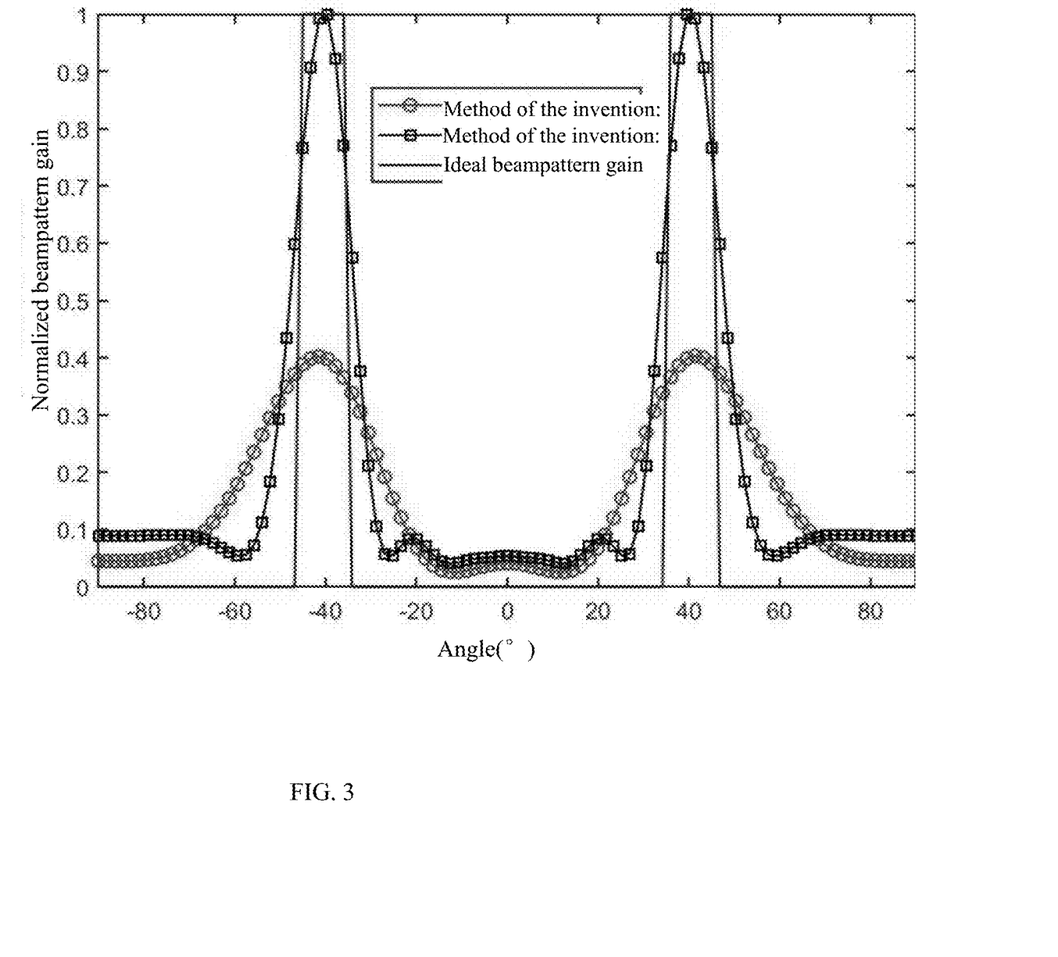
FIG. 3 is a schematic diagram showing the change of a beampattern gain with a detection angle when a total number of elements in an intelligent omni-surface in the embodiments of the present invention takes different values.

As shown in FIG. 3, the beampattern gain of the method provided by this embodiment is greater than the beampattern gain of other angles within the ranges of the angles to be detected $\mathcal{Q}_1$ and $\mathcal{Q}_2$, which shows that this embodiment can detect the radar targets. Moreover, when $\theta_1=-40°$ and $\theta_2=40°$, the beampattern gains achieve the dominant peaks in the angles of interest, which shows that the radar target is consistent with the reality at these two angles. In FIG. 3, this embodiment compares the changes of beampattern gains with the detection angles under different total number of element of the intelligent omni-surface, M. It can be seen from the figure that when the value of M is large, the beampattern gain is large. This shows that the performance of radar detection can be improved by increasing the number of elements of the intelligent omni-surface.

Figure 4:
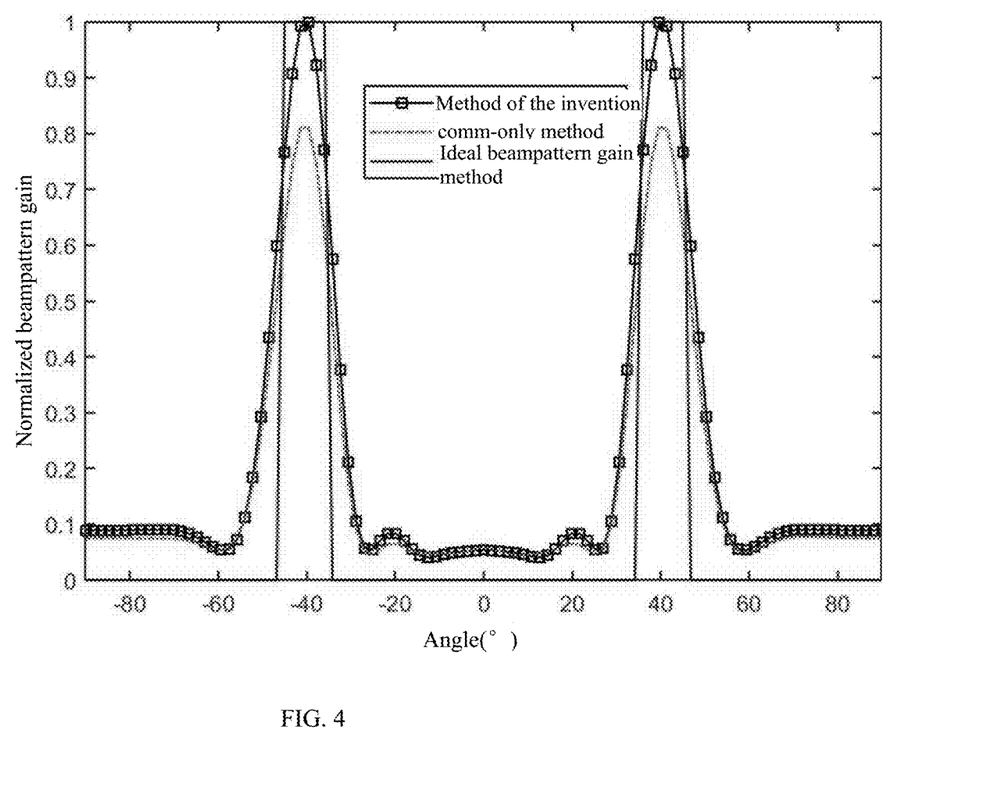
FIG. 4 is a schematic diagram showing the changes of the beampattern gains with the detection angles in the communication and radar target detection method based on the intelligent omni-surface provided by the embodiments of the present invention and in the prior art.

As shown in FIG. 4, the present invention compares the changes of the beampattern gains of different algorithms with detection angles. A comm-only method is a comparison method, which means that only communication signals are utilized to detect radar targets, that is, the base station only has the active beamforming vector w, but no radar covariance matrix $R_0$. The method for solving the active beamforming vector and the reflected and transmitted beamforming vectors in the comm-only method still adopts the method for solving the corresponding transmitted beamforming vector proposed by the present invention. As can be seen from the figure, the method provided by the present invention is superior to the comm-only algorithm, and has obvious gain improvement in a target angle direction and less gain leakage in a non-target angle direction.

In a specific implementation, the present application provides a computer storage medium and a corresponding data processing unit, wherein the computer storage medium is capable of storing a computer program, and the computer program, when executed by the data processing unit, can run the inventive contents of the communication and radar target detection method based on the intelligent omni-surface provided by the present invention and some or all steps in various embodiments. The storage medium may be a magnetic disk, an optical disk, a read-only memory (ROM) or a random access memory (RAM).

Those skilled in the art can clearly understand that the technical solutions in the embodiments of the present invention can be realized by means of a computer program and a corresponding general hardware platform thereof. Based on such understanding, the essence of the technical solutions in the embodiments of the present invention or the part contributing to the prior art, may be embodied in the form of a computer program, i.e., a software product. The computer program, i.e., the software product may be stored in a storage medium comprising a number of instructions such that one device (which may be a personal computer, a server, a singlechip, a MUU or a network device, and the like) comprising the data processing unit executes the methods described in various embodiments or some parts of the embodiments of the present invention.

The present invention provides the communication and radar target detection method based on the intelligent omni-surface. There are many methods and ways to realize the technical solutions. The above only describes the specific embellishments of the present invention. It should be pointed out that those of ordinary skills in the art can make some improvements and embellishments without departing from the principle of the present invention, and these improvements and embellishments should also be regarded as falling with the scope of protection of the present invention. All the unspecified components in the embodiments can be realized by the prior art.

What is claimed is:

1. A communication and radar target detection method based on an intelligent omni-surface applied to an integrated sensing and communication system, comprising the following steps:

step 1: constructing an optimization problem by maximizing a minimum beampattern gain as an objective function, the integrated sensing and communication system being an integrated sensing and communication system based on an intelligent omni-surface;

step 2: setting a constraint condition for the optimization problem constructed in the step 1, the constraint condition comprising a minimum rate constraint of a user, a maximum transmit power constraint of a base station, and amplitude and phase shift constraints of the intelligent omni-surface; and step 3: solving the optimization problem after setting with the constraint condition to obtain a solution for maximizing the minimum beampattern gain, thus realizing communication and radar target detection;

the integrated sensing and communication system based on the intelligent omni-surface in the step 1 is applied to a downlink communication, and a base station communicates with a user under the assistance of the intelligent omni-surface and completes radar target detection;

each element of the intelligent omni-surface in the step 1 has a function of both reflected and transmitted signals, a signal reflected by the element is referred to as a reflected signal, and a signal passing through the element is referred to as a transmitted signal; and a communication area covered by the intelligent omni-surface is divided into two parts, which are a reflection area and a transmission area;

the optimization problem in the step 1 is as follows:

$$\max_{w,R_0,v_r,v_t} \min_{q\in\{1,2,\ldots,Q\}} \mathcal{P}_{\theta_q}(w, R_0, v_t)$$

wherein, $w\in\mathbb{C}^{N\times 1}$ represents an active transmitted beamforming vector, $R_0\in\mathbb{C}^{N\times N}$ is a covariance matrix of radar signals, $$v_r = \left[\sqrt{\lambda_1^r} e^{j\theta_1^r}, \sqrt{\lambda_2^r} e^{j\theta_2^r}, \ldots, \sqrt{\lambda_M^r} e^{j\theta_M^r}\right]^H \text{ and}$$

$$v_t = \left[\sqrt{\lambda_1^t} e^{j\theta_1^t}, \sqrt{\lambda_2^t} e^{j\theta_2^t}, \ldots, \sqrt{\lambda_M^t} e^{j\theta_M^t}\right]^H$$

are reflected and transmitted beamforming vectors respectively, $\lambda_m^r$ and $\theta_m^r$ are a reflected amplitude and a reflected phase shift of an $m^{th}$ element of the intelligent omni-surface respectively, $\lambda_m^t$ and $\theta_m^t$ are a transmitted amplitude and a transmitted phase shift of the $m^{th}$ element of the intelligent omni-surface respectively, $P_{\theta_q}$ (w, $R_0$, $V_t$)=$\alpha^H(\theta_q)\Theta_r F(ww^H+R_0)F^H\Theta_r^H$, $\alpha(\theta_q)$ is a beampattern gain, $\alpha(\theta_q)=[1, e^{j2\pi\Delta\sin\theta_q}, \ldots, e^{j2\pi(N-1)\Delta\sin\theta_q}]^T$ is a steering vector of a $q^{th}$ angle to be detected on the intelligent omni-surface, $\theta_q$ is the $q^{th}$ angle to be detected relative to the intelligent omni-surface, $\Theta_t=\text{diag}(v_t^H)$ is a transmitted beamforming diagnal matrix, $F\in C^{M\times N}$ represents a channel between the intelligent omni-surface and the base station, M is a total number of elements of the intelligent omni-surface, N is a number of antennas equipped for the base station, Q is a total number of angles to be detected, $\Delta$ is a ratio of carrier wavelength to antenna spacing, $m\in\{1,2,\ldots,M\}$, $q\in\{1,2,\ldots,Q\}$, $C^{N\times 1}$ represents a complex column vector of N dimension, and $C^{M\times N}$ represents a complex number matrix of M×N dimension; diag{□} represents to converting the vector to a diagonal matrix, (□)$^T$ and (□)$^H$ respectively represent transposition and conjugate transposition of a vector, $e^{j\square}$ represents an exponential form of complex number, and sin(□) represents a sinusoidal function;

the constraint condition in the step 2 comprises:

constraint condition 1: $R \geq R_{min}$ constraint condition 2: $\|w\|^2 + Tr(R_0) \leq P_{max}$ constraint condition 3: $\lambda_m^r + \lambda_m^t = 1$, $\lambda_m^r \in [0, 1], \lambda_m^t \in [0, 1], m \in \{1, 2, \ldots, M\}$ constraint condition 4: $\theta_m^r \in [0, 2\pi), \theta_m^t \in [0, 2\pi), m \in \{1, 2, \ldots, M\}$ constraint condition 5: $R_0 \geq 0$ wherein, $$R = \log_2\left(1 + \frac{|g^H\Theta_r Fw|^2}{\sigma^2}\right)$$

is an achievable data rate of the user, $g\in C^{M\times 1}$ represents a channel between the user and the intelligent omni-surface, $\Theta_r=\text{diag}(v_r^H)$ is a reflected beamforming diagnal matrix, $R_{min}$ is a minimum rate of the user, $\sigma^2$ is a variance of an additive white Gaussian noise, $\pi$ is a ratio of circumference to diameter, $\|\square\|^2$ is a square of normal of a vector $l_2$, $Tr(\square)$ is a trace of matrix, $|\square|^2$ is a square of a complex modulus, $P_{max}$ represents a maximum transmit power of the base station, and $R_0\geq 0$ represents that $R_0$, is a semi-positive definite matrix; and the constraint condition 1 is the minimum rate constraint of the user, the constraint condition 2 is the maximum transmit power constraint of the base station, the constraint condition 3 and the constraint condition 4 are amplitude and phase shift constraints of the intelligent omni-surface respectively.

2. The communication and radar target detection method based the intelligent omni-surface according to claim 1, wherein the solving the optimization problem after setting with the constraint condition in the step 3 comprises:

step 3-1: initializing $V^{(0)}_r$ and $V^{(0)}_t$, and setting an iteration index $\tau_0=0$;

step 3-2: for given $V^{(\tau_0)}_r$ and $V^{(\tau_0)}_t$, updating $W^{(\tau_0+1)}$ and $R^{(\tau_0+1)}$ by using a closed-form solution of an active beamforming matrix and a covariance matrix;

step 3-3: for given $W^{(\tau_0+1)}$ and $R^{(\tau_0+1)}_0$, updating $V^{(\tau_0+1)}_r$, $V^{(\tau_0+1)}_t$ and $\chi^{(\tau_0+1)}$ by using a joint optimization algorithm of reflected and transmitted beamforming vectors;

step 3-4: setting $\tau_0=\tau_0+1$;

step 3-5: repeating the step 3-2 to the step 3-4 until $\chi^{(\tau_0)}$ is converged to obtain an optimal active beamforming matrix W, a radar covariance matrix $R_0$, a reflected beamforming matrix $V_r$, and a transmitted beamforming matrix $V_t$;

step 3-6: using Cholesky decomposition to recover and obtain an optimal active beamforming vector w, a reflected beamforming vector $v_r$, and a transmitted beamforming vector v, from the matrixes W, $V_r$, and $V_t$, respectively, which are $W=ww^H$, $V_r=v_r v_r^H$ and $V_t=v_t v_t^H$; and step 3-7: outputting the solution for maximizing the minimum beampattern gain, which is, outputting an optimal active beamforming vector w, a radar covariance matrix $R_0$, a reflected beamforming matrix $v_r$, and a transmitted beamforming matrix $v_t$;

wherein, $V_r\in C^{M\times M}$ and $V_t\in C^{M\times M}$ are a reflected beamforming matrix and a transmitted beamforming matrix respectively, $W\in C^{N\times N}$ is an active beamforming matrix, and $\chi$ is an introduced variable, used for transforming the maximum-minimum optimization problem in the step 1 into the maximizing optimization problem; and $W^{(\tau_0)}, R^{(\tau_0)}_0, V^{(\tau_0)}_r, V^{(\tau_0)}_t$ and $\chi^{(\tau_0)}$ are values corresponding to W, $R_0$, $V_r$, $V_t$, and $\chi$ in the $\tau_0^{th}$ iteration.

3. The communication and radar target detection method based the intelligent omni-surface according to claim 2, wherein the closed-form solution of the active beamforming matrix and the covariance matrix in the step 3-2 is:

$$\begin{cases} \underline{W} = ww^H \\ R_0 = \underline{R_0} + \underline{W} - W \end{cases}$$

wherein, $w=(h^H \underline{W} h)^{-1/2}\underline{W} h$, and $h^H=g^H\Theta_r F$; and $\underline{W}\in C^{N\times N}$ and $\underline{R_0}\in C^{N\times N}$ are optimal solutions of a following convex optimization problem:

$$\max_{\underline{W},\underline{R_0},\chi>0} \chi$$

constraint condition: $P_{\theta_q}(\underline{W}, \underline{R_0}, v_t) \geq \chi, q \in \{1, 2, \ldots, Q\}$ constraint condition: $Tr(hh^H \underline{W}) \geq \sigma^2(2^{R_{min}} - 1)$ constraint condition: $Tr(\underline{W}) + Tr(\underline{R_0}) \leq P_{max}$ constraint condition: $\underline{R_0} \geq 0$, and $\underline{W} \geq 0$ wherein, $P_{\theta_q}(\underline{W}, \underline{R_0}, v_t t)=\alpha^H(\theta_q)\Theta_r F(\underline{W}+\underline{R_0})F^H\Theta_r^H\alpha(\theta_q)$, and $\underline{W}\geq 0$ represents that $\underline{W}$ is a semi-positive definite matrix.

4. The communication and radar target detection method based the intelligent omni-surface according to claim 3, wherein the joint optimization algorithm of the reflected and transmitted beamforming vectors in the step 3-3 comprises the steps as follows:

step 3-3-1: initializing $V^{(0)}_r$ and $V^{(0)}_t$ and a penalty coefficient $\eta$, wherein the penalty coefficient $\eta$ is used for punishing $\Psi(V_r, V_t)>0$, and $\eta \gg 1$;

step 3-3-2: setting an iterations $\pi_1=0$;

step 3-3-4: for given W and $R_0$, solving a joint optimization problem of the reflected and transmitted beamforming vectors, and updating $V^{(\pi_1+1)}_r$ and $V^{(\pi_1+1)}_t$;

step 3-3-5: setting $\pi_1=\pi_1+1$; and step 3-3-6: repeating the step 3-3-4 to the step 3-3-5 until $\Psi(V^{(\tau_1)}_r, V^{(\tau_1)}_t)$ is converged;

wherein, $V^{(\tau_1)}_r$ and $V^{(\tau_1)}_t$ are values corresponding to $V_r$ and $V_t$ during the $\tau^{th}_1$ iteration respectively, $\Psi(V_r, V_t)=\|V_r\|_*-\|V_r\|_2+\|V_t\|_*-\|V_t\|_2$ is a penalty term, $\Psi(V^{(\tau_1)}_r, V^{(\tau_1)}_t)=\|V^{(\tau_1)}_r\|_*-\|V^{(\tau_1)}_r\|_2+\|V^{(\tau_1)}_t\|_*-\|V^{(\tau_1)}_t\|_2$, $\|\square\|_*$ represents a kernel norm of a, matrix, and $\|\square\|_2$ represents a spectral norm of the matrix.

5. The communication and radar target detection method based the intelligent omni-surface according to claim 4, wherein the joint optimization problem of the reflected and transmitted beamforming vectors in the step 3-3-4 is:

$$\min_{V_r, V_t, \chi > 0} \{-\chi + \eta \overline{\Psi}(V_r, V_t)\}$$

constraint condition: $P_{\theta_q}(W, R_0, V_t) \geq \chi, q \in \{1, 2, \ldots, Q\}$ constraint condition: $Tr(\Gamma V_r) \geq \sigma^2(2^{R_{min}} - 1)$ -continued constraint condition: $[V_r]_{m,m} + [V_t]_{m,m} = 1, m \in \{1, 2, \ldots, M\}$ constraint condition: $V_r \geq 0$, and $V_t \geq 0$ wherein, $P_{\theta_q}(W, R_0, V_t)=Tr(Y_q V_t)$, and $Y_q=\text{diag}(\alpha^H(\theta_q))F(W+R_0)F^H\text{diag}(\alpha(\theta_q))$; and $\Gamma=\text{diag}(g^H)FWF^H\text{diag}(g)\overline{\Psi}_q(V_r, V_t)=\|V_r\|_*-\overline{\nabla}^{(\tau_1)}_r+\|V_t\|_*-\overline{\nabla}^{(\tau_1)}_t$ is an approximate value of $\Psi(V_r, V_t)$, while $V_r \geq 0$ and $V_t \geq 0$ respectively represent that $V_r$ and $V_t$ are semi-positive definite matrixes; $\overline{\nabla}^{(\tau_1)}_r$ and $\overline{\nabla}^{(\tau_1)}_t$ are respectively first-order Taylor approximations of $\|V_r\|_2$ and $\|V_t\|_2$ during the $\tau^{th}_1$ iteration, which are defined as follows:

$$\overline{V}^{(\tau_1)}_r = \|V^{(\tau_1)}_r\|_2 + Tr\left[u^{(\tau_1)}_{max,r}\left(u^{(\tau_1)}_{max,r}\right)^H \left(V_r - V^{(\tau_1)}_r\right)\right]$$

$$\overline{V}^{(\tau_1)}_t = \|V^{(\tau_1)}_t\|_2 + Tr\left[u^{(\tau_1)}_{max,t}\left(u^{(\tau_1)}_{max,t}\right)^H \left(V_t - V^{(\tau_1)}_t\right)\right]$$

wherein, $u^{(\tau_1)}_{max,r}$ and $u^{(\tau_1)}_{max,t}$ are eigenvectors corresponding to maximum eigenvalues of $V^{(\tau_1)}_r$ and $V^{(\tau_1)}_t$ during the $\tau^{th}_1$ iteration respectively.

6. The communication and radar target detection method based the intelligent omni-surface according to claim 5, wherein a radar target detection performance is improved by increasing a total number of elements M in the intelligent omni-surface.

* * * * *